United States Patent [19]
Wood

[11] Patent Number: 5,939,726
[45] Date of Patent: Aug. 17, 1999

[54] INFRARED RADIATION SOURCE

[75] Inventor: Donald S. Wood, Santa Rosa, Calif.

[73] Assignee: Cal-Sensors, Inc., Santa Rosa, Calif.

[21] Appl. No.: 08/989,903

[22] Filed: Dec. 11, 1997

[51] Int. Cl.⁶ .................................................. G01J 1/00
[52] U.S. Cl. .................. 250/504 R; 250/493.1; 250/495.1
[58] Field of Search ............... 250/504 R, 493.1, 250/495.1

[56] References Cited

U.S. PATENT DOCUMENTS

| | | |
|---|---|---|
| 3,316,405 | 4/1967 | Astheimer . |
| 4,499,382 | 2/1985 | Vincent . |
| 4,859,859 | 8/1989 | Knodle et al. . |
| 5,324,951 | 6/1994 | Kocache et al. . |
| 5,438,233 | 8/1995 | Boland et al. . |
| 5,602,398 | 2/1997 | Knodle et al. . |
| 5,838,016 | 11/1998 | Johnson ............................. 250/504 R |
| 5,864,144 | 1/1999 | Laine ................................. 250/504 R |

*Primary Examiner*—Edward P. Westin
*Assistant Examiner*—Nikita Wells
*Attorney, Agent, or Firm*—Malcolm B. Wittenberg

[57] ABSTRACT

A pulsable infrared radiation (IR) source which can be used in nondispersive infrared gas analyzers. The pulsable IR source includes a narrow strip of thin metallic foil vertically mounted to the opposite sides of pins of a small transistor type (TO-5) header at the base of a large diameter deep reflector. Infrared radiation from both sides of the heated foil is directly reflected to form a highly efficient source. The foil can be oxidized or otherwise coated under controlled conditions to maximize its emissivity at operating temperatures up to approximately 1200 degrees K. The package is resistance welded with a cap and hermetically sealed window of a suitable material and filter as required to transmit the desired infrared spectrum. An appropriate inert backfill gas prevents further oxidation and enhances the pulsing capability.

20 Claims, 3 Drawing Sheets

INFRARED RADIATION SOURCE

TECHNICAL FIELD OF THE INVENTION

The present invention relates generally to a pulsable infrared radiation source which can be used in nondispersive infrared gas analyzers. The present infrared source has made it possible to eliminate mechanical chopping of the transmitted beam while still maintaining alternating current (AC) signal processing capability. The present invention provides a highly efficient, stable, pulsable infrared radiation source in the range of one to three watts for use in the new generation of small portable gas analysis systems.

BACKGROUND OF THE INVENTION

Infrared (IR) radiation sources of many varieties including direct current and pulsable versions have been developed for use with nondispersive gas analyzers. Typically, an infrared source, gas cell and detector are mounted along a common optical axis. With suitable calibration a gas introduced into the cell can be identified on the basis of selective absorption of infrared radiation by the gas. A selective IR filter is usually placed in the optical path to limit detection to a narrow band of wavelengths.

The development of pulsable IR sources has made it possible to eliminate mechanical chopping of the transmitted beam and still maintain AC signal processing capability. These pulsed IR sources allow a significant savings in weight, power consumption and increased reliability for use in a new generation of small portable gas analysis systems. Prior devices, however, do not provide for sufficient efficiency, power level or required stability. Thus, it is an object of the present invention to provide a small, highly efficient pulsable IR source in the range of b 1–3watts of power for use in these new systems.

SUMMARY OF THE INVENTION

The present invention is directed to an infrared radiation source comprising a base having pins passing therethrough for feeding electrical energy to a strip of high emissivity material. The high emissivity material is in the form of a foil strip having planar surfaces and opposing ends. The opposing ends of the strip are electrically connected to the pins so that upon passing of electrical energy through the foil, the foil becomes electrically heated and emits infrared radiation. The present invention also includes a cap attached to the base and an aperture through the cap for passage of infrared radiation emanating from the foil. The invention is further characterized in that the infrared radiation source is oriented by having its planar surface substantially perpendicular to the aperture with a deep reflector to redirect energy from both sides of the foil through the aperture. Appropriate windows and filters are used to select optimal IR wavelengths of interest. The package may be hermetically sealed with a backfill gas to enhance pulsability.

DETAILED DESCRIPTION OF THE INVENTION

Figure 1A:
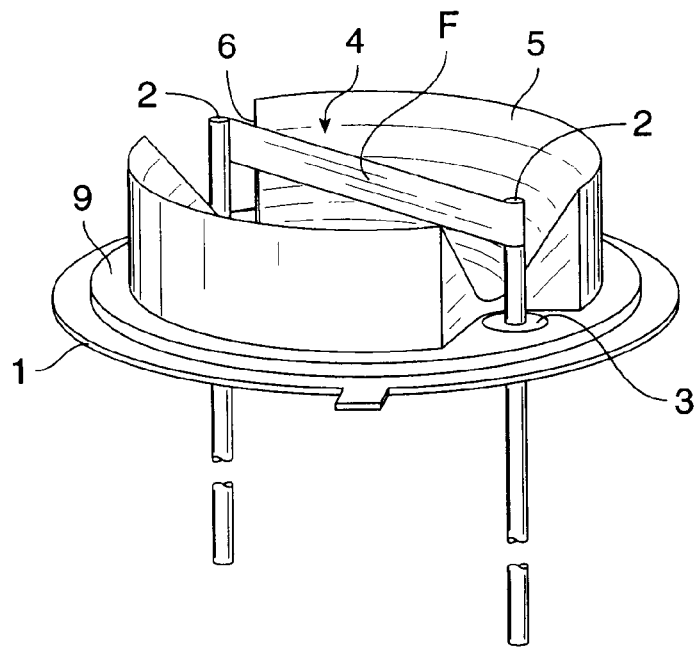
FIGS. 1A and 1B are perspective views of the IR source showing the vertical mounting orientation of the foil within a deep reflector and the external geometry of the present device, respectively. The diameter of the reflector is shown as being approximately equal to the diameter of the clear aperture of the cap assembly shown in FIG. 1B.

The IR source defined by this invention consists of a narrow strip of thin metallic foil mounted around the opposite sides of opposing pins of a small transistor outline (TO-5) type metal package with hermetic glass sealed feedthrough pins. The plane of the foil is parallel to the optical axis of a deep reflector in the shape of a parabola or ellipse attached to the face of a header and which has angled cut-outs (FIGS. 1A and 2A) to provide clearance around the feed-through pins. The midpoint of the foil is ideally located at the focal point of the reflector. The entire foil lies below the plane of the top of the reflector so that the reflector subtends a large solid angle around the source.

The emitting element is a narrow strip of metal such as nichrome 80/20 foil that, depending upon the desired power input, varies in width from 0.020 in. to 0.050 in. The surface of the foil is oxidized or otherwise coated under controlled conditions to maximize the emissivity to greater than or equal to 0.88. The thickness of the foil is ideally 5 microns to 8 microns but is not limited to those values. The optimal thickness and width are selected on the basis of the desired input power which is typically one to three watts, pulsing frequency, duty cycle and modulation characteristic.

The reflector can be made of polished aluminum, which could be plated or coated with gold or silver with a diameter equal to the clear aperture of the cap. Small angled cut-outs are made on opposite sides of the reflector to provide clearance around the eyelets for the mounting and electrical feed-through pins in the header. The cut-outs are sufficiently deep so that the edge of the foil at its lowest position will not touch and be electrically short circuited by the reflector.

The cap contains a concentric hole or aperture and may have a hermetically sealed window of a material transmitting in the desired IR wavelength range. Antireflection coatings and coated filters may also be used to increase transmission and limit the wavelength range. Window and filter materials include sapphire, calcium fluoride, zinc selenide, silicon and germanium.

The hermetic sealed cap assembly is resistance welded to the support base in an inert gas atmosphere such as nitrogen, a combination of nitrogen and helium or pure helium. The purpose of the inert gas is two fold. It prevents further oxidation of the foil element which may cause instability in the emitted radiation and shorten its useable life and it provides a thermally conductive path to dissipate heat. The high thermal conductivity of helium, or a mixture of nitrogen and helium, decreases the thermal time constant of the foil over that achieved with pure nitrogen and increases the rate at which the source can be pulsed.

The thermal expansion and contraction of the thin foil caused by pulsing of the electrical input current is absorbed by the mechanical attachment of the foil to the support pins. This is accomplished by wrapping the foil around the pin and welding it to the backside on one or both pins. As the foil expands it tends to uncoil the foil from behind the pin and to recoil itself as the foil cools similar in action to that of a watch spring. The diameter of the pins along the length of the attachment area can be varied to accommodate foil materials with different coefficients of thermal expansion and stiffness.

Another benefit of the vertical orientation of the present foil is that the detector only views the reflected image of the foil rather than the foil itself. Therefore, any lateral movement of the foil causing an increase in path length from a radiating element of the foil to the detector plane on one side of the foil is offset by an equal and opposite decrease in path length from the same corresponding element on the other side of the foil resulting in no overall change in average path length or image intensity from any slight movement of the foil.

The infrared source described in this invention is primarily designed to combine the radiant energy from both sides of a heated metallic strip mounted within a deep parabolic or elliptical reflector into a highly efficient reflected beam. The benefits of this geometry are most apparent where the width of the metallic strip is sizable with respect to the dimensions of the reflector and include low fabrication cost, high efficiency and high power (in the range of one to three watts) in a small TO-5 type package.

Figure 1B:
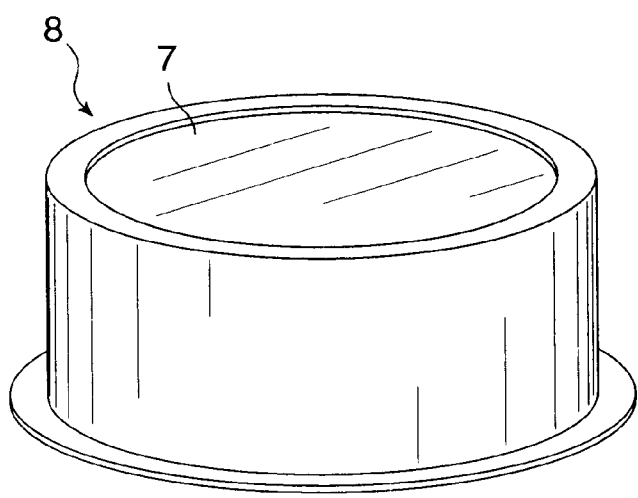

Turning to the drawings, FIG. 1A shows a perspective view of the preferred source configuration according to this invention. The mounting package 1 is a standard TO-5 style with two pins 2, a mounting pedestal 9 and glass feedthrough seals 3. A polished aluminum parabolic reflector 5 with focal point F is centered and attached to pedestal 9 with the cut-outs 6 located around the pins 2. Although the figures show a parabolic reflector in describing the present invention, an elliptical or other shaped reflector can likewise be employed herein. The source element 4 is a strip of metal such as NiCr 80/20 foil varying in width from approximately 0.020 in. to 0.050 in. and in thickness from approximately 5 microns to 8 microns depending upon the desired operating conditions. The emitting element 4 is resistance welded to the sides of the pins 2 at a height such that the midline of the element is ideally at the focal point F in a method to be described. The emitting element 4 is electrically oxidized or otherwise coated under controlled conditions to achieve high emissivity. The package 1 with reflector 5 and mounted foil strip 4 is enclosed by a hermetic resistance welded cap 8 (FIG. 1B). A window 7 is hermetically sealed to the inside lip of cap 8. Window materials and filters in the preferred embodiment of this IR source depend on the particular wavelengths and bandwidth desired and include sapphire, calcium fluoride, zinc selenide, silicon or germanium. The header assembly is capped in an inert gas at 1 ATM pressure consisting of nitrogen, a combination of nitrogen and helium or pure helium.

Figure 2A:
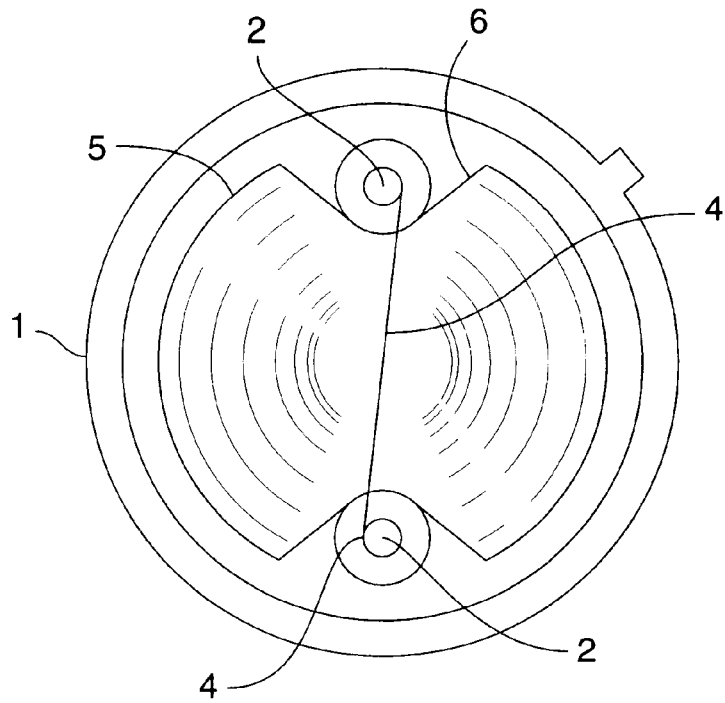
FIGS. 2A and 2B are top and side plane views of the present invention showing the IR source relative to the present mounting pins and the reflector. The center point of the strip is coincident with the focal point of the reflector.
Figure 2B:
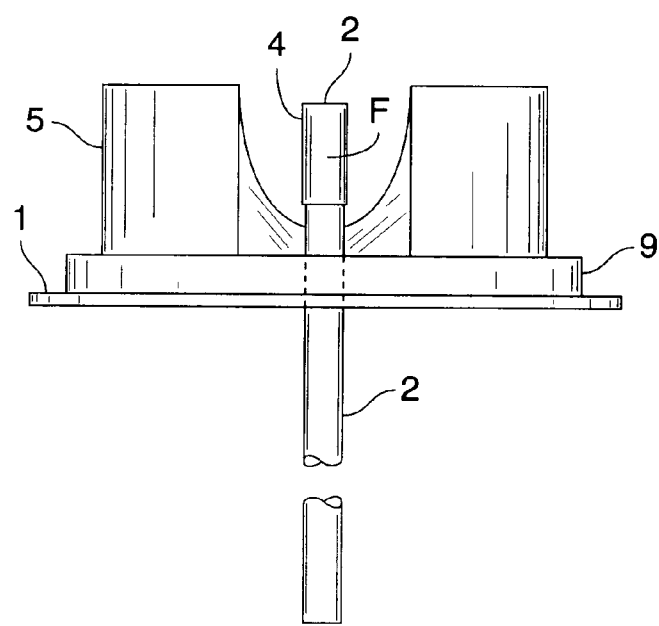

FIGS. 2A and 2B show plane views of the top and side of the preferred embodiment of the present invention, respectively. The metal foil 4 is wrapped around opposite sides of the pins 2 so that the center of the foil strip is aligned with the center of the reflector 5. The edge of the foil 4 is parallel to the pedestal 9 and the height on the pins 2 is adjusted, based on the width of the foil strip so that the focal point of the reflector F is at the midline of the foil. However, it is noted that the height of the foil can be adjusted so that its center can be positioned above or below the reflector's focal point in order to fine tune the emitted IR energy.

Figure 3:
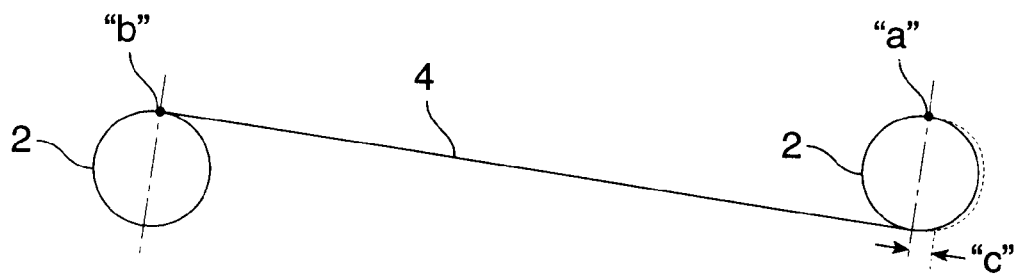
FIG. 3 is a plane view looking down on the top of the mounting pins and the edge of the emitting strip. The drawing shows the attachment of the strip around the back side of one of the pins to provide strain relief for thermal expansion and contraction of the strip.

FIG. 3 is a top view of the pins 2 and foil strip 4 that shows how the foil is welded to the pins. The foil strip at one end is welded at point "a" and then wrapped around the pin and over to the opposite pin and welded at point "b". When the foil is heated during pulsed operation the foil expands and contracts along the line of the foil tending to unwrap the partial turn up to the weld at "a". As an example, with NiCr 80/20 heated to 1173 degrees Kelvin, the total increase in length "c" over a total span of 0.200 in. between pins 2 is 3.24 mils. This amplitude of expansion and contraction is small relative to the diameter of the pin of 18 mils and causes negligible flexing of the weld at "a".

Figure 4:
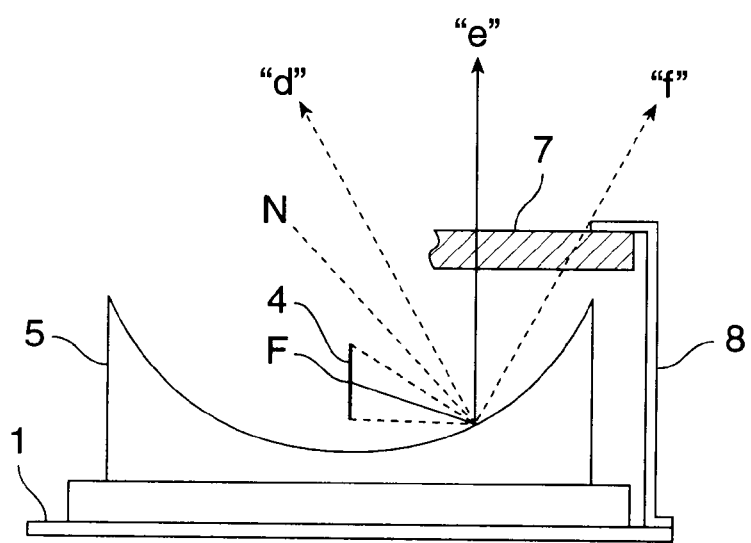
FIG. 4 is a cross sectional view of the IR source perpendicular to the plane of the foil showing typical ray traces from the center and edges of the strip to an arbitrary point on the reflector.

FIG. 4 shows a cross section view of the IR source transverse to the foil 4. The midline of the foil is centered at reflector focal point F. The vertical plane of the foil strip is parallel to the optic axis of the reflector 5. Typical rays from the upper edge, midline and lower edge of the foil (in the plane of the cross section) reflect about the normal to the reflector surface N and pass through the window along directions "d", "e" and "f", respectively.

It is apparent from the above description and from the descriptions of prior art that the IR source specified in this invention provides greater IR flux and greater energy efficiency at all wavelengths than prior art IR sources of comparable size.

The embodiments of this invention as described above illustrate the general principles of operation of the IR source and basic design parameters. However, other embodiments that would facilitate use of this device in other applications would be apparent to those knowledgeable in the art. Therefore, the above disclosure is not to be construed as limiting and the scope of the invention is defined by the following claims.

We claim:

1. An infrared radiation source comprising a base having pins passing therethrough for feeding electrical energy to a strip of high emissivity material, a strip of high emissivity material in the form of a foil strip having a planar surface and opposing ends, said opposing ends being electrically connected to said pins so that upon passage of electrical energy through said foil, said foil becomes electrically heated and emits infrared radiation, said infrared radiation source further comprising a deeply curved reflector attached to said base, a cap attached to said base and an aperture through said cap for passage of infrared radiation emanating from said foil, said infrared radiation source being further characterized in that said foil is oriented by having its planar surface substantially perpendicular to said aperture so that radiation emanating from both sides of the foil is redirected by the reflector through the aperture.

2. The infrared radiation source of claim 1 wherein said reflector is in the shape of a parabola having a focal point.

3. The infrared radiation source of claim 1, wherein said cap, base and aperture with a window form an enclosure for said foil which is hermetically sealed.

4. The infrared radiation source of claim 3 wherein an inert gas is contained within said enclosure, said inert gas comprising a member selected from the group consisting of nitrogen, helium and mixtures thereof.

5. The infrared radiation source of claim 1 wherein said foil is electrically oxidized or otherwise coated under controlled conditions to achieve high emissivity.

6. The infrared radiation source of claim 2 wherein said planar surface of said foil has a midline, said midline being substantially coincident with said focal point.

7. The infrared radiation source of claim 2 wherein said planar surface of said foil has a midline, said midline is above or below the focal point F of the parabolic reflector in order to fine tune the focusing properties of the emitted IR beam.

8. The infrared radiation source of claim 1 wherein said reflector is in the shape of an ellipse having two focal points.

9. The infrared radiation source of claim 8 wherein the midline of said foil is located at a first focal point of the elliptical reflector and energy from the emitting foil is focused at a second focal point external to the aperture.

10. The infrared radiation source of claim 8 wherein said planar surface of said foil has a midline, said midline is above or below a first focal point of the elliptical reflector in order to fine tune the focusing properties of the emitted IR beam at a second focal point.

11. The infrared radiation source of claim 1 wherein said reflector is in the shape of a cylinder with parabolic or elliptical cross section.

12. The infrared radiation source of claim 11 wherein said planar surface of said foil has a midline, said midline being located approximately along a line of focus of the parabolic cylinder or along the closest line of focus of the elliptical cylinder in order to optimize the emitted IR beam.

13. The infrared radiation source of claim 3 wherein the window with an antireflection coating or coated bandpass or edge filter, said window selected from the group consisting of sapphire, calcium fluoride, zinc selenide, silicon or germanium.

14. The infrared radiation source of claim 1 wherein at least one end of said foil is wrapped around at least one pin to provide a mechanism for strain relief caused by thermal expansion and contraction of said foil.

15. The infrared radiation source of claim 1 wherein the source is scaled in size so that the foil maintains the same geometric proportions and orientation to the reflector but with higher power output capability.

16. The infrared radiation source of claim 1 wherein said reflector comprises a non ferrous metal.

17. The infrared radiation source of claim 16 wherein said non ferrous metal comprises polished aluminum.

18. The infrared radiation source of claim 1 wherein said reflector comprises molded plastic.

19. The infrared radiation source of claim 1 wherein said reflector is coated or plated with a member selected from the group consisting of aluminum, gold and silver.

20. The infrared radiation source of claim 18 wherein said molded plastic is coated with a member selected from the group consisting of aluminum, gold and silver.

* * * * *